US012800056B2

(12) United States Patent
Sato et al.

(10) Patent No.: US 12,800,056 B2
(45) Date of Patent: Nov. 17, 2026

(54) VALVE DEVICE

(71) Applicant: FUJIKIN INCORPORATED, Osaka (JP)

(72) Inventors: Tatsuhiko Sato, Osaka (JP); Nobuo Nakamura, Osaka (JP); Tomohiro Nakata, Osaka (JP); Kengo Tsujino, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 362 days.

(21) Appl. No.: 18/718,204

(22) PCT Filed: Feb. 21, 2023

(86) PCT No.: PCT/JP2023/006122
§ 371 (c)(1),
(2) Date: Jan. 6, 2025

(87) PCT Pub. No.: WO2023/189013
PCT Pub. Date: Oct. 5, 2023

(65) Prior Publication Data
US 2025/0129863 A1 Apr. 24, 2025

(30) Foreign Application Priority Data
Mar. 30, 2022 (JP) ................................ 2022-055475

(51) Int. Cl.
*F16K 31/122* (2006.01)

(52) U.S. Cl.
CPC ........ *F16K 31/122* (2013.01); *F16K 31/1221* (2013.01); *F16K 31/1225* (2013.01); *F16K 31/1226* (2013.01)

(58) Field of Classification Search
CPC ............ F16K 31/1221; F16K 31/1225; F16K 31/1226
See application file for complete search history.

(56) References Cited

U.S. PATENT DOCUMENTS 7,971,599 B2 * 7/2011 Aoyama ............ F16K 31/1226 251/63.5
9,518,673 B2 * 12/2016 Tanikawa ................ F16K 7/17
(Continued)

FOREIGN PATENT DOCUMENTS

JP 2009-002524 A 1/2009
JP 2020-20371 A 2/2020
(Continued)

OTHER PUBLICATIONS

International Search Report issued in International Patent Application No. PCT/JP2023/006122, dated Apr. 25, 2023, along with an English translation thereof.

*Primary Examiner* — Kevin F Murphy
(74) *Attorney, Agent, or Firm* — Greenblum & Bernstein, P.L.C.

(57) ABSTRACT

A valve device includes a valve body, a valve element and a multi-stage cylinder actuator for moving the valve element, wherein the multi-stage cylinder actuator includes a casing divided into an upper cylinder chamber and a lower cylinder chamber, an upper piston slidably arranged in an upper cylinder chamber, and a lower piston having an operation shaft for operating the valve element and an abutment shaft for contacting the upper piston, the upper piston has an upper operation air passage for supplying operation air, the lower piston has a lower operation air passage in communication with the upper operation air passage at a contact portion with the upper piston, and an O-ring is provided at the contact portion to prevent leakage of the operation air.

7 Claims, 6 Drawing Sheets

(56) References Cited

U.S. PATENT DOCUMENTS

2020/0041007 A1 2/2020 Nakata et al.
2020/0318754 A1 10/2020 Iwata
2021/0108738 A1* 4/2021 Glime, III ............. F15B 11/122

FOREIGN PATENT DOCUMENTS

JP 2020-169706 A 10/2020
JP 2021-032391 A 3/2021

* cited by examiner

【fig.1】
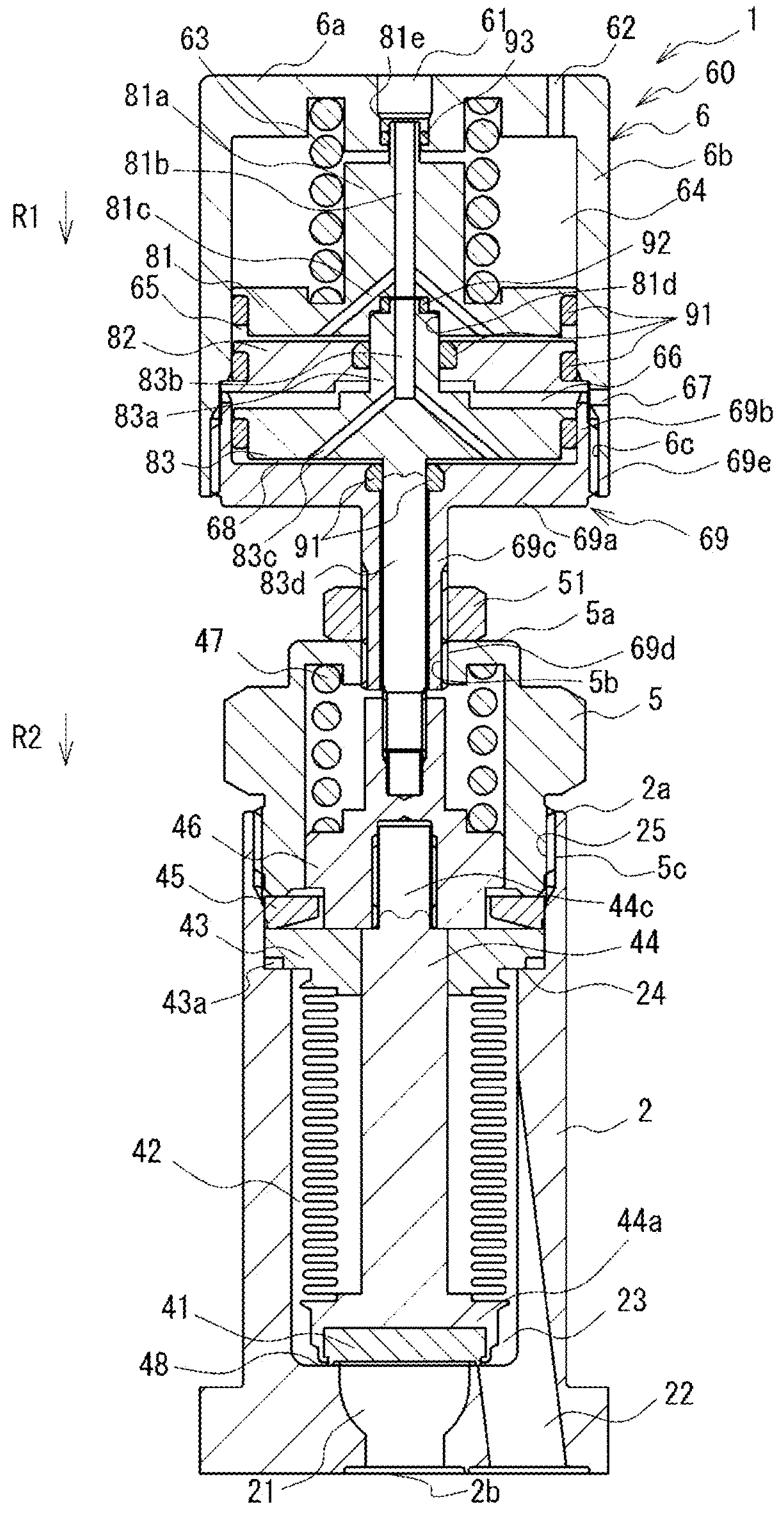

【fig.2】
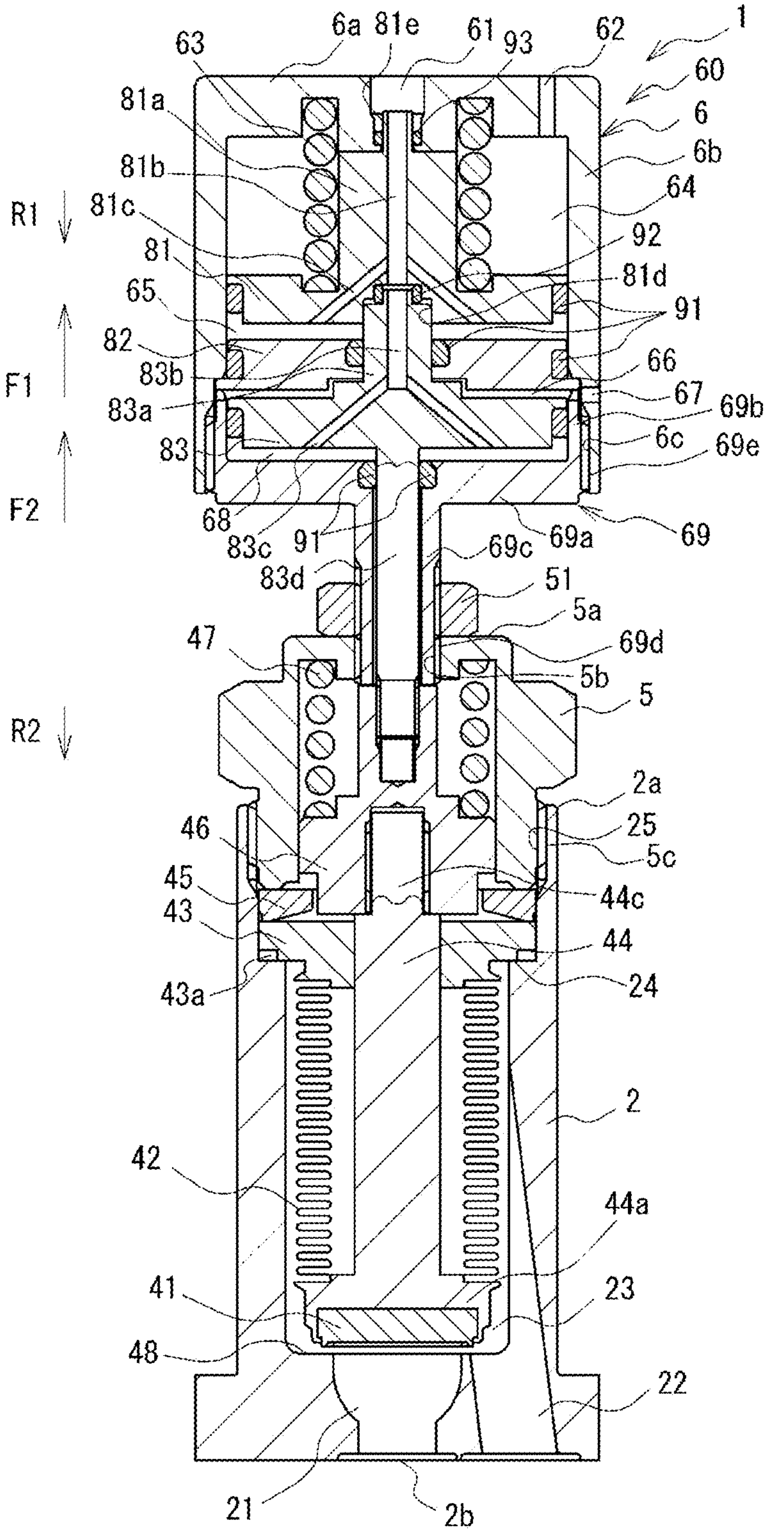

【fig.3】
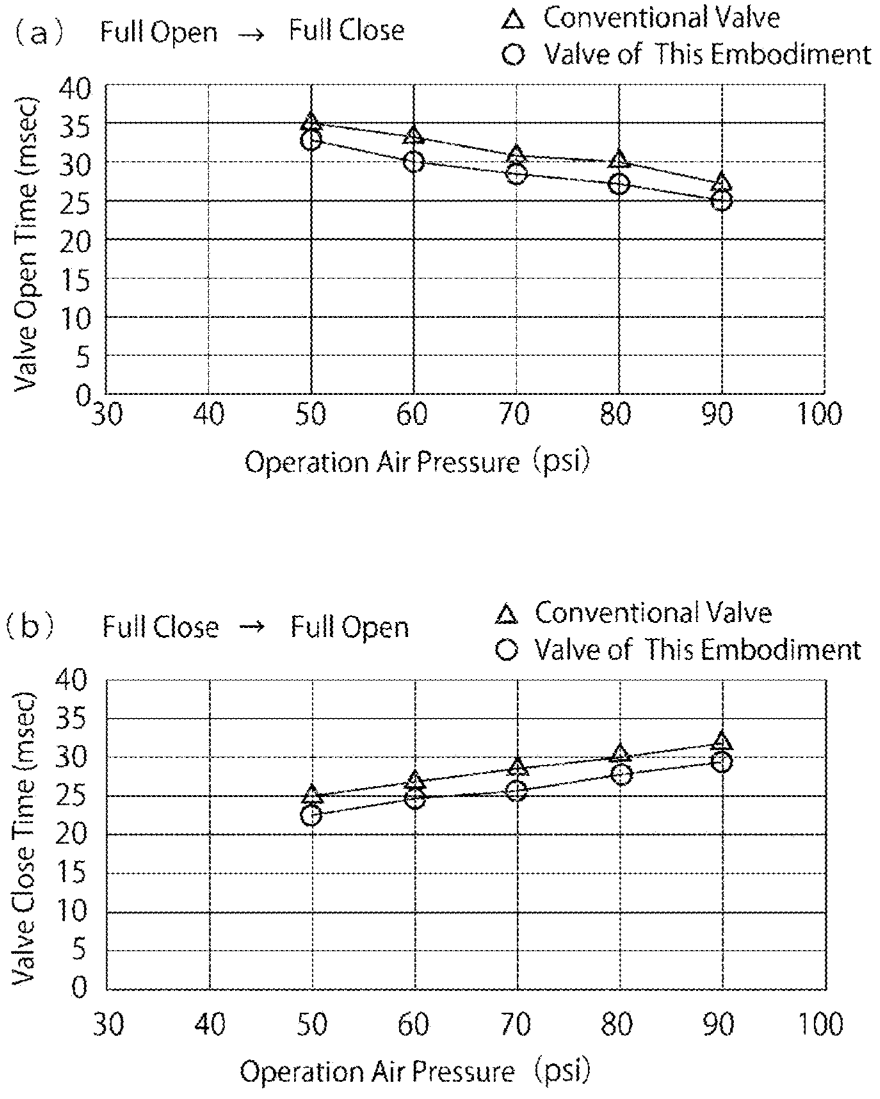

【fig.4】
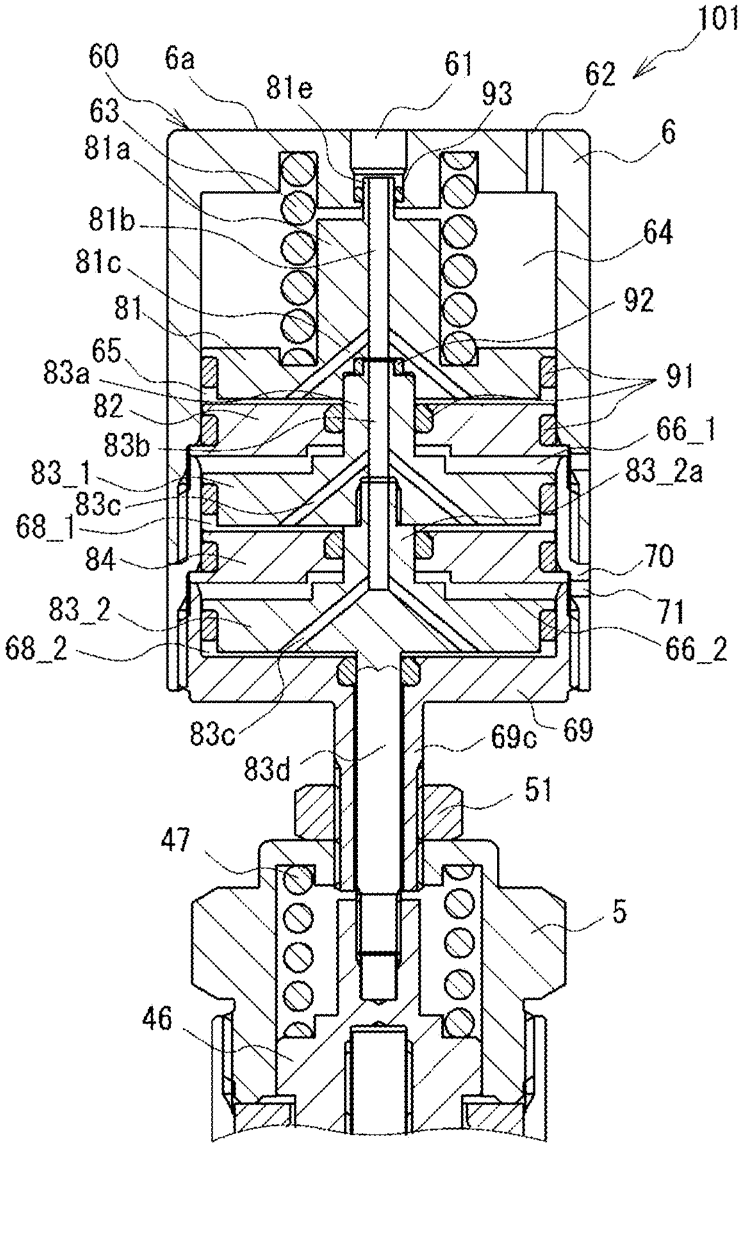

【fig.5】
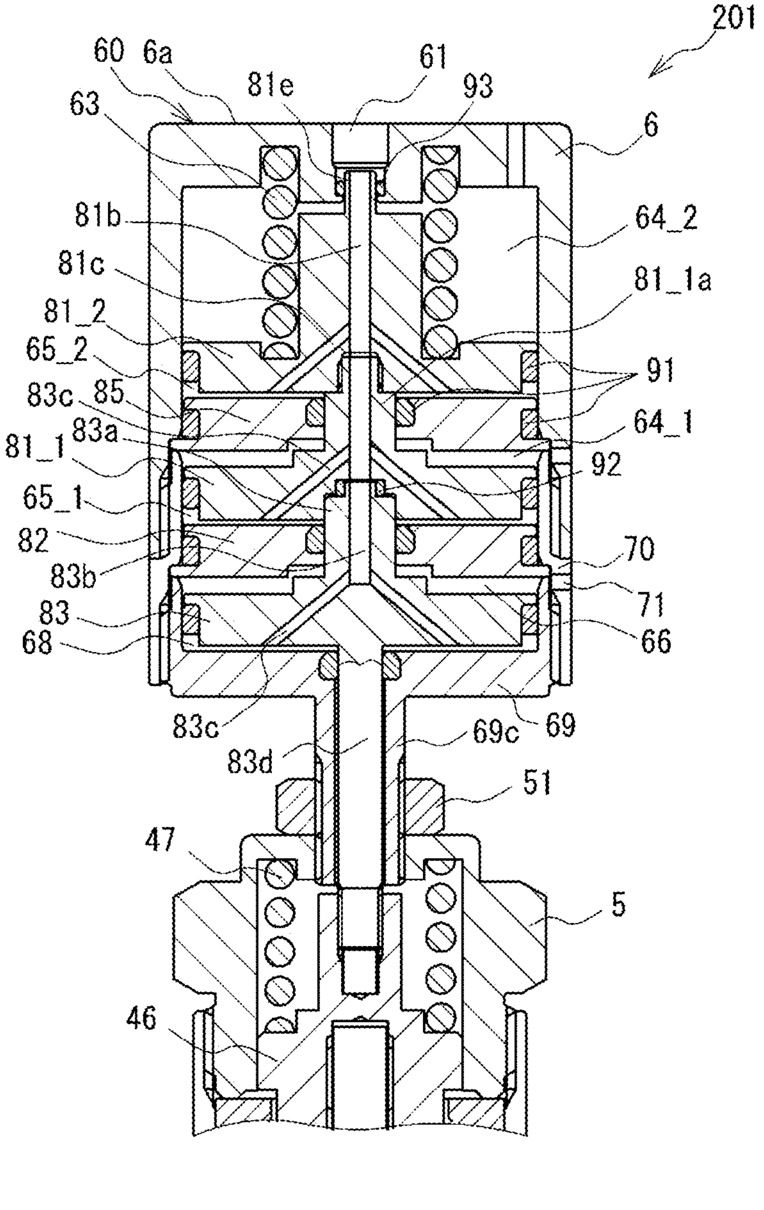

【fig.6】
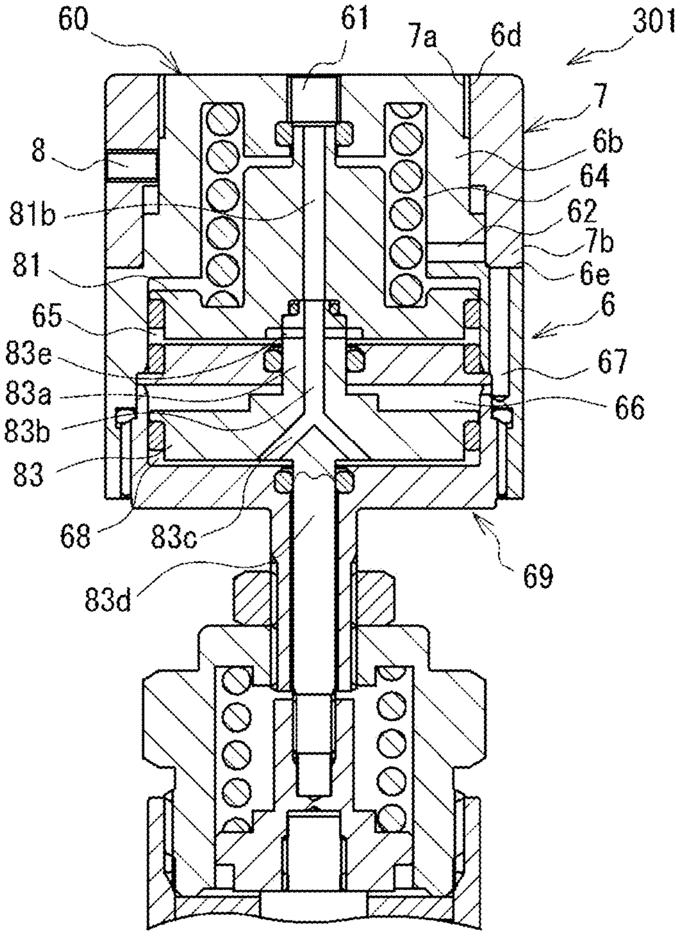

VALVE DEVICE

TECHNICAL FIELD

The present invention relates to a valve to be used for fluid control, in particular, to a valve device capable of realizing a large flow rate control and a high-speed response in order to control a process gas or the like for a semiconductor manufacturing apparatus.

BACKGROUND ART

In a semiconductor-manufacturing process, a valve capable of controlling a process gas with a large-flow-rate at a high speed is required along with increase in the diameter of a wafer and precisions of film formation and etching in the process. As such a valve, an air-driven valve capable of increasing a moving stroke of a valve body and increasing a flow rate is used.

This air-driven valve device uses an air cylinder actuator to press and separate the valve element from a valve seat, and the air cylinder mechanism is driven by supplying and releasing an operation air controlled by an external solenoid valve.

In order to increase the speed of the valve opening operation, a driving force of the air cylinder is required to be enhanced, and in view of mounting on an integrated gas system, the size in a width direction of valve device is required to be small. For these reasons, a multi-stage cylinder actuator is employed as a valve open-close actuator.

In such a multi-stage cylinder actuator, conventionally, an upper piston and a lower piston are separately manufactured, and thereafter, they are screwed together to form an assembly, and a passage for supplying the operation air to the inside of the assembly is also provided (Patent Literature 1).

However, from the viewpoint of ease of manufacturing, there is employed a structure in which the upper piston and the lower piston are left separated and not connected together, and their end portions are brought into contact with each other, and an operation air supply passage to the cylinder chambers of the respective stages is provided in the respective cylinders so as to communicate with each other at the contact points (Patent Literatures 2 and 3).

Patent Literature

PTL 1: Japanese Laid-Open Patent Application No. 2021-032391

PTL 2: Japanese Laid-Open Patent Application No. 2020-169706

PTL 3: Japanese Laid-Open Patent Application No. 2009-002524

SUMMARY OF INVENTION

Technical Problem

However, along with the increase in the diameter of wafer and the precisions of film formation and etching in the process, there is a demand to further shorten a response time, that is, a time from reception of a valve opening command to an actual opening state, or a time from reception of a valve closing command to an actual closing state.

In order to realize further high-speed operation, in particular, in a multi-stage cylinder in which an upper piston and a lower piston are separated from each other, it is considered necessary to supply and exhaust the operation air to and from a pressure receiving region of a cylinder chamber of each stage as quickly and evenly as possible. For example, if the timings of rising and falling of the pressure receiving regions of the upper and lower pistons are different, rising of the lower piston is delayed and the valve opening takes longer time even if the upper piston is raised first. If unevenness of pressure occurs in the pressure receiving region of the piston, tilting of the piston may occur at the start of movement, and it may take a longer time for the piston to actually rise.

Further, in the structure in which the upper piston and the lower piston are separated from each other, there is a concern that the operation air leaks from the contact portions of the upper piston and the lower piston, causing a variation in the pressure in the plurality of cylinder chambers and a delay in the valve opening/closing operation caused thereby.

The present invention is made to solve these problems, and it is an object of the present invention to provide a valve device which can realize high flow rate and high-speed response, and which is easy to manufacture.

Solution to Problem

The valve device of the present invention is a valve device comprising: a valve body having a first flow path and a second flow path formed therein;

- a valve element for shutting off and communicating between the first flow path and the second flow path by contacting and leaving from a valve seat provided horizontally in an opening of the first flow path; and
- a multi-stage cylinder actuator for making the valve body contact and leave from the valve seat, the multi-stage cylinder actuator comprising:

- a casing having a cylindrical shape, extending upward from the valve body, having both end portions closed by an upper end plate and a lower end plate, respectively, and having an inside partitioned into an upper cylinder chamber and a lower cylinder chamber by a partition plate;
- an upper piston arranged slidably in the upper cylinder chamber, biased in a downward direction by an upper spring and driven in an upward direction by a pressure of an operation air in an upper pressure chamber formed between the upper cylinder chamber and the partition plate: and
- a lower piston arranged slidably within the lower cylinder chamber, which is biased downward by a lower spring and which is driven upward by the pressure of the operation air in the lower pressure chamber formed between the lower end plate and the lower end plate, the lower piston having an operation shaft which projects through the lower end plate to operate the position of the valve element, and an abutment shaft which projects through the partition plate and abuts the upper piston,
- the upper piston having an upper operation air passage for introducing the operation air from the outside and supplying the operation air to the upper pressure chamber and the lower pressure chamber,
- the lower piston having a lower operation air passage in communication with the upper operation air passage at a contact portion between the upper piston and the abutment shaft, for introducing the operation air and supplying the operation air to the lower pressure chamber, wherein the contact portion is provided with an O-ring for preventing leakage of the operation air while allowing relative displacement between the upper piston and the contact shaft.

It is preferable that the upper piston has a fitting hole fitted to the abutment shaft of the lower piston, the contact portion is formed between a tip end portion of the abutment shaft and a deep end of the fitting hole, and the O-ring is arranged between an outer periphery of a reduced-diameter portion provided in a tip end portion of the abutment shaft and an inner periphery of the fitting hole.

It is preferable that the upper operation air passage includes a main flow path provided on a central axis in the upper piston, and the lower operation air passage includes a main flow path provided on a central axis in the lower piston, and at least one of the upper-stage operation air passage and the lower-stage operation air passage further includes a plurality of branch flow path that branch radially from the main flow path when viewed from upper side and open to a lower surface of the upper piston facing the upper pressure chamber or a lower surface of the lower piston facing the lower-stage pressure chamber.

When the upper operation air passage has the branch flow path, the number of the branch flow path is preferably 3 or more, and when the lower operation air passage has the branch flow path, the number of the branch flow path is preferably 3 or more.

The construction may be such that the casing further includes a second partition plate for partitioning the lower cylinder chamber into a first lower cylinder chamber and a second lower cylinder chamber from the upper side, the lower piston includes a first lower piston arranged in the first lower cylinder chamber and a second lower piston arranged in the second lower cylinder chamber, the first lower piston and the second lower piston are fixedly connected to each other so as to penetrate through the second partition plate and be provided integrally slidable, the lower pressure chamber includes a first lower pressure chamber formed between the first lower piston and the second partition plate and a second lower pressure chamber formed between the second lower piston and the lower end plate, the operation shaft is provided on the second lower piston, and the abutment shaft is provided on the first lower piston.

The construction may be such that the casing further includes a third partition plate for partitioning the upper cylinder chamber into a first upper cylinder chamber and a second upper cylinder chamber from the lower side, the upper piston includes a first upper piston arranged in the first upper cylinder chamber, and a second upper piston arranged in the second upper cylinder chamber, the first upper piston and the second upper piston are fixedly connected so as to penetrate through the third partition plate and be provided integrally slidable, the upper pressure chamber includes a first upper pressure chamber formed between the first upper piston and the partition plate and a second upper pressure chamber formed between the second upper piston and the third partition plate.

Preferably, the valve element is attached to a support mechanism including a bellows, which integrally seals the opening of the first flow path and the opening of the second flow path from the outside while allowing vertical movement of the valve element.

Advantageous Effects of Invention

According to the present invention, in a valve device having a multi-stage cylinder actuator including upper and lower pistons separated from each other and operation air passages provided inside the respective pistons and communicating to each other to supply an operation air, an O-ring is provided at an a contact portion between the upper piston and the lower piston, so that it is possible to prevent the operation air from leaking from the contact portion while allowing a variation in the distance between the upper piston and the lower piston. Thus, an imbalance in the operating pressure on the upper piston and the lower piston caused by the leakage can be prevented, and the operating speed can be increased while the ease of manufacturing is ensured.

In addition, in the configuration in which each operation air passage has a main flow path provided on the central axis within each piston and multiple branch flow paths that branch radially from the main flow path when viewed from upper side and open to the lower surface of the piston facing the pressure chamber, the pressure in the pressure receiving area of the piston can be more uniform, and it is possible to suppress tilting of the piston at the start of movement to increase the operating speed.

Further, in the construction in which the upper cylinder chamber is partitioned into two cylinder chambers and the upper piston is formed to include two upper pistons arranged in the respective cylinder chambers, or the construction in which the lower cylinder chamber is partitioned into two cylinder chambers and the lower piston is formed to include two lower pistons arranged in the respective cylinder chambers, the driving force of the piston can be increased.

Further, by attaching the valve element to the support mechanism including the bellows, it is possible to realize the large flow rate control while maintaining the leak-proof durability performance of the controlled fluid.

BRIEF DESCRIPTION OF DRAWINGS

FIG. 1 is a longitudinal sectional view showing a valve device according to a first embodiment of the present invention.

FIG. 2 is a longitudinal cross-sectional view of the valve device of FIG. 1 in a closed state;

FIG. 3 is a graph showing an exemplary relation between operation time and the operation air pressure in the valve device according to this embodiment and a conventional valve device, where (a) represents a valve opening time and (b) represents a valve closing time.

FIG. 4 is a longitudinal sectional view showing an upper portion of a valve device according to a second embodiment of the present invention.

FIG. 5 is a vertical cross-sectional view showing an upper portion of a valve device according to a third embodiment of the present invention.

FIG. 6 is a vertical cross-sectional view showing an upper portion of a valve device according to a fourth embodiment of the present invention.

DESCRIPTION OF EMBODIMENTS

Hereinafter, embodiments of the present disclosure will be described with reference to the drawings. In the description, the same elements are denoted by the same reference numerals, and redundant description will be omitted as appropriate.

First Embodiment

FIG. 1 is a cross-sectional view showing a configuration of a valve device 1 according to a first embodiment of the present invention in an open state. FIG. 2 is a cross-sectional view of valve device 1 of FIG. 1 in a closed state. As shown in FIG. 1, valve device 1 includes a valve body 2, a valve element 41, a bonnet 5, and a multi-stage cylinder actuator 60.

The valve body 2 is made of stainless-steel and has an upper surface 2*a* and side surfaces opposite to each other. From the upper surface 2*a*, a valve chamber 23 having a step portion 24 is opened, and an inner peripheral screw portion 25 to be threadedly engaged with bonnet 5 is formed. The valve body 2 also forms a first flow path 21 and a second flow path 22. The first flow path 21 is a flow path that opens to a lower surface 2*b* and a bottom surface of the valve chamber 23. The second flow path 22 is a flow path that opens to the lower surface 2*b* and a side surface of the valve chamber 23.

The valve element 41 is a member that is brought into contact with and separated from the valve seat 48 to thereby shut off and communicate between the first flow path 21 and the second flow path 22. In the present embodiment, a seat flat structure is adopted in which a flat portion around the opening of the first flow path 21 is used as the valve seat 48, and the valve element 41 is a substantially disk-shaped valve element made of a heat-resistant resin, and an annular protrusion for sealing is provided in a peripheral portion of a surface of the valve seat 48 that is in contact with the valve seat.

Further, the valve element 41 is attached to a bellows mechanism (42, 43, 44) and is held so as to be movable in the vertical direction, and can be brought into contact with and separated from the valve seat 48.

The bellows mechanism includes a substantially rod-shaped stem 44 extending upward with a valve element holding portion 44*a* for holding the valve element 41 at the lower end portion; a support ring 43 having an outer periphery fitted to the inner peripheral surface of an upper portion of the valve chamber 23, a lower surface abutting the step portion 24, and an inner periphery guiding the stem 44 in the vertical direction; and a substantially cylindrical bellows 42 welded air-tightly or liquid-tightly to the lower surface of the support ring 43 and upper surface of the valve element holding portion 44*a* of the stem 44, so as to surround the rod-shaped portion of the stem 44.

The bellows 42 is formed of spring steel or the like, and has a large number of pleats so as to be able to expand and contract in the vertical direction. Incidentally, a seal member 43*a* is provided at a corner between the lower surface and the outer peripheral surface of the support ring 43, so as to seal between these surfaces and the valve body 2. The upper end portion of the stem 44 protrudes upward from the support ring 43 and forms a screw rod portion 44*c*.

The bellows mechanism (42, 43, 44) holds the valve element 41 in a vertically movable manner, and integrally seals the opening of the first flow path 21 and the opening of the second flow path 22 in the valve chamber 23 from the outside, thereby enhancing the leak-proofness of the controlled fluid.

In the present invention, the valve element 41 and the support mechanism thereof are not limited to this configuration, and for example, a diaphragm may be used, and thereby a movable function as a valve element and a sealing function of a valve chamber can be realized. However, the use of a bellows mechanism is advantageous in terms of maximum valve opening and durability.

Bonnet 5 is a substantially cylindrical bag-shaped member having an open lower end, and an outer peripheral screw portion 5*c* is formed at a lower end portion thereof, and a is threadedly engaged with the inner peripheral screw portion 25 of the valve body 2. As a result, bonnet 5 is fixed to the valve body 2, and the support ring 43 is pressed against and fixed to the valve body 2 via holding ring 45.

Inside bonnet 5, a substantially stepped cylindrical connecting member 46 provided with screw holes coaxially from the upper side and the lower side is provided so as to be slidable vertically. Into the lower screw hole of the connecting member 46, a screw rod portion 44*c* of the upper end portion of the stem 44 is screwed, and into the upper screw hole, an outer peripheral screw portion of a lower end portion of the operation shaft 83*d* of the lower piston 83 to be described later is screwed, thereby connecting the stem 44 and the operation shaft 83*d* of the lower piston 83.

Inside bonnet 5, a lower spring 47 made of a coiled spring, which will be described later, is arranged to biases the connecting member 46 downward.

The multi-stage cylinder actuator 60 is an actuator that makes the valve element 41 contact and separate from the valve seat, and includes a casing (6, 69), an upper piston 81, and a lower piston 83.

The casing (6, 69) is a cylindrical container in which both upper and lower end portions are closed by an upper end plate 6*a* and a lower end plate 69*a*, respectively, and the inside is divided into an upper cylinder chamber 64 and a lower cylinder chamber 66 by a partition plate 82. In this embodiment, the casing is formed by screwing an upper casing 6 and a lower casing 69.

The lower casing 69 is formed by integrally forming a cylindrical portion 69*b*, a lower end plate 69*a*, and a lower protruding tube portion 69*c*, and an outer peripheral screw portion 69*d* provided on the lower protruding tube portion 69*c* is screwed into a through screw hole 5*b* bored in the upper end plate portion 5*a* of bonnet 5, and is fixed by a fixing nut 51.

The lower end portion of the lower protruding tube portion 69*c* serves as an upper limit stopper for the movable range of the connecting member 46, and its vertical position can be adjusted by screwing with the through screw hole 5*b* of bonnet 5. This makes it possible to adjust the maximum distance between the valve element 41 connected to the connecting member 46 via the stem 44 and the valve seat 48, that is, the maximum opening (Cv) of valve device 1.

The upper casing 6 is formed by integrally forming a cylindrical portion 6*b* and an upper end plate 6*a*, and an inner peripheral screw portion 6*c* formed at a lower end portion of the cylindrical portion 6*b* is screwed to an outer peripheral screw portion 69*e* formed at a cylindrical portion 69*b* of the lower casing 69. At this time, an outer edge portion of a partition plate (bulkhead) 82 is sandwiched and fixed between the upper end portion of the lower casing 69 and the inner peripheral step portion of the cylindrical portion 6*b*, and inside of the casing (6, 69) is divided into an upper cylinder chamber 64 and a lower cylinder chamber 66.

Incidentally, the upper end plate 6*a* of the upper casing 6 is provided with an operation air introduction hole 61 penetrating therethrough, and the cylindrical portion 6*b* is provided with a vent hole 62 to the non-pressure chamber portion of the upper cylinder chamber 64 and a vent hole 67 to the non-pressure chamber portion of the lower cylinder chamber 66.

The upper piston 81 is a member that is arranged so as to be slidable in the upper cylinder chamber 64, biased downward by an upper spring 63, that is a coiled spring, and is driven upward by a pressure of operation air in an upper pressure chamber 65 formed between the upper piston and the partition plate 82. On the outer periphery of the upper piston 81, an O-ring 91 is provided so that the upper piston 81 is slidable while maintaining air-tightness with the inner periphery of the casing 6. Also, between the outer periphery of the protruding tube portion 81*e* protruding further from the upper end portion of the upper piston 81 and the inner periphery of the operation air introduction hole 61 penetrating the upper end plate 6*a* of the casing 6, an O-ring 93 is arranged so that the protruding tube portion 81*e* can be moved while maintaining air-tightness.

On the other hand, the lower piston 83 is a member that is arranged in the lower cylinder chamber 66 so as to be slidable, biased downward by a lower spring 47 arranged in bonnet 5, and driven upward by a pressure of the operation air in a lower pressure chamber 68 formed between the lower piston 83 and the lower end plate 69*a*. On the outer periphery of the lower piston 83, an O-ring 91 is provided so that is lower piston 83 is slidable while maintaining air-tightness with the inner periphery of the casing 6.

The lower piston 83 has an operation shaft 83*d* protruding downward. The operation shaft 83*d* protrudes through a center hole of the lower end plate 69*a* of the lower casing 69 and the inside of the lower protruding tube portion 69*c*, and an outer peripheral screw portion formed in a tip end portion of the operation shaft 83*d* is screwed to the upper screw hole of the connecting member 46 as described above. Thus, the operation shaft 83*d* is coupled to the stem 44, so that the position of the valve element 41 attached to the lower end portion thereof can be operated.

Between the outer periphery of the operation shaft 83*d* and the inner periphery of the central hole of the lower end plate 69*a* of the lower casing 69, an O-ring 91 is arranged so that the operation shaft 83*d* is slidable while maintaining airtightness.

The lower piston 83 also has an upwardly projecting abutment shaft 83*a*. The abutment shaft 83*a* passes through the partition plate 82, is fitted into the fitting hole 81*d* of the upper piston 81, and is in contact with the upper piston 81 at a deep end of the fitting hole 81*d*. Also between the outer periphery of the abutment shaft 83*a* and the inner periphery of the central hole of the partition plate 82, an O-ring 91 is arranged so that the abutment shaft 83*a* is slidable while maintaining airtightness.

The upper piston 81 has an upper operation air passage 81*b* therein. The upper operation air passage 81*b* includes a main flow path 81*b* extending from an upper end of a protruding tube portion 81*e* provided on an upper protruding portion 81*a* of the upper piston 81 through an inner central axis, and a plurality of branch flow paths 81*c* which branch radially from the main flow path 81*b* when viewed from upper side and open to a lower surface of the upper piston 81 facing the upper pressure chamber 65. Thus, the operation air can be introduced from the operation air introduction hole 61 of the upper casing 6, and supplied to the upper pressure chamber 65 and the lower piston 83. The number of branch flow paths 81*c* is preferably 3 or more, so that the pressure in the pressure receiving area of the piston can be made uniform, and tilting of the piston at the time of starting movement can be suppressed to increase the operating speed.

On the other hand, the lower piston 83 has a lower operation air passage 83*b* therein. The lower operation air passage 83*b* has a main flow path 83*b* that opens to a tip end portion of the abutment shaft 83*a* and extends on the central axis, and a plurality of branch flow paths 83*c* that branch radially from the main flow path 83*b* when viewed from upper side and open to the lower surface of the lower piston 83 facing the lower pressure chamber 68.

Thus, the operation air from the upper operation air passage 81*b* is introduced from the contact part with the upper piston 81, and the operation air can be supplied to the lower pressure chamber 68. The number of branch flow paths 83*c* is preferably 3 or more, so that the pressure in the pressure receiving area of the piston can be made uniform, and tilting of the piston at the time of starting movement can be suppressed to increase the operating speed.

The tip end portion of the abutment shaft 83*a* of the lower piston 83 is provided with a reduced diameter portion, and an O-ring 92 is arranged between the outer periphery of the reduced diameter portion and the inner periphery of the fitting hole of the upper piston 81. The O-ring 92 prevents leakage of the operation air while allowing relative displacement between the upper piston and the abutment shaft. As the O-ring 92, a known material can be used, and for example, a fluoro rubber, a silicone rubber, or a nitrile rubber can be used. Accordingly, an imbalance in the operating pressure between the upper piston and the lower piston caused by leakage of the operation air can be prevented, and the operating speed can be increased while ensuring ease of manufacturing.

In order to increase the operation speed of valve device 1 by shortening the inflow and outflow times of the operation air, the volumes of the upper pressure chamber 65 and the lower pressure chamber 68 in the fully closed condition are designed to be as small as possible.

Next, operation of the valve device of this embodiment configured as described above will be described.

First, when the operation air is not supplied to the operation air introduction hole 61, the upper pressure chamber 65 and the lower pressure chamber 68 do not have thrust. Therefore, the upper piston 81 receives the biasing force R1 of the upper spring 63, and presses the lower piston 83 downward, and the lower piston 83 receives the pressing force (=R1) of the upper piston 81 and the biasing force R2 of the lower spring 47, and presses the valve element 41 against the valve seat 48, so that the valve is fully closed.

When the operation air is supplied from an external control solenoid valve (not shown) to the operation air introduction hole 61, the operation air is introduced from the upper end of the protruding tube portion 81*e* of the upper piston 81 into the main flow path 81*b* of the upper operation air passage 81*b*. A part thereof is supplied to the upper pressure chamber 65 through a plurality of branch flow paths 81*c* that branch radially from the main flow path 81*b*. The other part of the operation air is introduced from the tip end portion of the abutment shaft 83*a* of the lower piston 83 fitted to the fitting hole 81*d* to the main flow path 83*b* of the lower operation air passage 83*b*, and is further supplied to the lower pressure chamber 68 through the plurality of branch flow paths 83*c*.

As a result, the pressure in the upper pressure chamber 65 and the pressure in the lower pressure chamber 68 increase, and the thrust of F1, F2 is generated as shown in FIG. 2, so that the upper piston 81, which receives only the biasing force R1 of the upper spring 63, is first moved up by receiving a force of a difference F1−R1. Consequently, the lower piston 83 is released from the pressing force (=R1) of the upper piston 81 and moves up under the force of the differential F2-R2 against the biasing force R2 of the lower spring 47, and the upper end of the connecting member 46 abuts against the lower end of the lower protruding tube portion 69*c* of the lower casing 69 and stops. As a result, the valve element 41 is separated from the valve seat 48, and the valve is fully opened.

During the upward movement, that is, when the pistons are not in contact with any of the upper limit and the lower limit, it is considered that the upper piston 81 and the lower piston 83 are not in fully contact or fully separated from each other within the deformation range of the O-ring 92 and they are moved up by the thrusts of the respective pressure chambers (65, 68) and the biasing forces of the springs (63, 47).

In the conventional structure, there is no O-ring in the contact portion between the upper piston 81 and the lower piston 83, and the operation air leaks from there and flows into the upper pressure chamber 65, and it is difficult to reach the lower pressure chamber 68 far from the operation air introduction hole 61, so that the pressure increase in the lower pressure chamber 68 tends to be delayed from the pressure increase in the upper pressure chamber 65. As a result, the upward movement of the lower piston 83 tended to be delayed and the valve opening time tended to be long. In the valve device of the present invention, since the O-ring 92 is provided in the contact part to prevent leakage of the operation air, it is possible to accelerate the increase in the pressure in the lower pressure chamber 68, and it is possible to accelerate the upward movement of the lower piston 83 and shorten the valve opening time.

In the fully opened state, as shown in FIG. 2, the upper limit position of the lower piston 83 is determined by a Cv-adjusting mechanism, that is, abutment between an upper end of the connecting member 46 and a lower end of the lower protruding tube portion 69*c* of the lower casing 69, while the upper limit position of the upper piston 81 is determined by abutment between the upper piston 81 and a ceiling of the casing 6.

Next, in the valve device 1 in fully opened state, when an external control solenoid valve (not shown) is switched to open to the atmosphere, the operation air is exhausted from the upper pressure chamber 65 and the lower pressure chamber 68 through the upper operation air passage 81*b* and the lower operation air passage 83*b*.

As a result, the pressures in the upper pressure chamber 65 and the pressure in the lower pressure chamber 68 decrease and the thrusts F1, F2 decrease, so that the upper piston 81 moves down under the biasing force R1 of the upper spring 63, and the lower piston 83 moves down under the biasing force R2 of the lower spring 47. Accordingly, the valve element 41 is brought into contact with the valve seat 48 to close the valve.

During the downward movement, that is, when the pistons are not in contact with any of the upper limit or the lower limit, it is considered that the upper piston 81 and the lower piston 83 are not in fully contact or fully separated to each other within the deformation range of the O-ring 92, and they are moved down by the thrusts of the pressure chambers (65, 68) and the biasing forces of the springs (63, 47).

In the conventional construction, there is no O-ring 92 in the contact portion between the upper piston 81 and the lower piston 83, and the operation air in the upper pressure chamber 65 flows out to the main flow path 81*b* through the contact portion in addition to the branch flow path 83*c*. Accordingly, flow out of the operation air from the lower pressure chamber 68, that is far from the operation air introduction hole 61, to the main flow path 83*b*, 81*b* is prevented, and the pressure drop in the lower pressure chamber 68 tended to be delayed from the pressure drop in the upper pressure chamber 65. As a result, there was a tendency that downward movement of the lower piston 83 was delayed and the valve closing time was long.

In the valve device of the present invention, since the O-ring 92 is provided in the contact portion to prevent leakage of the operation air, the pressure drop in the lower pressure chamber 68 can be accelerated, and the downward movement of the lower piston 83 can be accelerated to shorten the valve closing time.

Further, since the operation air passages each has a main flow path (81*b*, 83*b*) provided on the central axis in the respective pistons (81,83) and a plurality of branch flow paths (81*c*, 83*c*) branched radially from the main flow path (81*b*, 83*b*) and opened on the lower surface of the piston (81,83) facing the pressure chamber (65,68), the pressure in the pressure receiving area of the piston (81, 83) can be made uniform, and tilting of the piston (81, 83) at the time of start movement can be suppressed to increase the operating speed.

FIG. 3 is a graph showing an exemplary relation between the operation time of a valve device and the operation air pressure of the valve device according to the present embodiment and a conventional valve device, where (a) represents a valve opening time and (b) represents a valve closing time. The conventional valve device is a valve device in which no O-ring 92 is provided at the contact portion between the upper piston and the lower piston. The valve opening time is a time from reception of the valve opening command until the valve is actually opened, and the valve closing time is a time from reception of the valve closing command until the valve is actually closed. As shown in the diagram, the valve device of this embodiment is 2 to 3 msec shorter than the conventional valve device in terms of valve opening time and valve closing time.

Second Embodiment

FIG. 4 is a vertical cross-sectional view showing an upper portion of a valve device 101 according to second embodiment of the present invention. The lower part of this valve device is the same as that of FIG. 1, and thus is not shown. This embodiment is one in which the lower stage side of the multi-stage cylinder actuator 60 has a two-stage structure, and a total of three-stage cylinders are formed in the first embodiment.

In this embodiment, the lower cylinder chamber (66) is divided into a first lower cylinder chamber 66_1 and a second lower cylinder chamber 66_2 from the upper side by a second partition plate 84. The second partition plate 84 has the same shape as the partition plate 82, and has sealing O-rings 91 on the outer peripheral side and the inner peripheral side. The casing 6 further includes an intermediate casing 70 between the upper casing 6 and the lower casing 69, and the inner peripheral screw portion of the lower portion of the intermediate casing 70 is screwed to the outer peripheral screw portion of the lower casing 69, and the inner peripheral screw portion of the lower end portion of the upper casing 6 is screwed to the outer peripheral screw portion of the upper portion of the intermediate casing 70, thereby they are coupled to each other. The partition plate 82 is fixed such that its outer edge portion is sandwiched between the upper end portion of the intermediate casing 70 and the inner peripheral step portion of the upper casing 6, and the second partition plate 84 is fixed such that its outer peripheral edge portion is sandwiched between the upper end portion of the lower casing 69 and the inner peripheral step portion of the intermediate casing 70.

The lower piston (83) includes a first lower piston 83_1 arranged in the first lower cylinder chamber 66_1 and a second lower piston 83_2 arranged in the second lower cylinder chamber 66_2. The second lower piston 83_2 has an upper protrusion **83_2*a* having an outer peripheral screw portion in its tip end portion, and the upper protrusion 83_2*a* passes through the central through-hole of the second partition plate 84 and is screwed to a screw hole of the first lower piston 83_1. Thus, the first lower piston 83_1 and the second lower piston 83_2 are fixedly connected so as to penetrate through the second partition plate 84 and are integrally slidably provided. The lower pressure chamber (68) includes a first lower pressure chamber 68_1 formed between the first lower piston 83_1 and the second partition plate 84, and a second lower pressure chamber 68_2 formed between the second lower piston 83_2 and the lower end plate 69*a*. The operation shaft 83*d* is provided on the second lower piston 83_2, and the abutment shaft 83*a* is provided on the first lower piston 83_1. The intermediate casing 70 is provided with a vent hole 71 to the non-pressure chamber portion of the second lower cylinder chamber 66_2**.

The main flow path **83*b* of the lower operation air passage 83*b* extends on the central axes of the first lower piston 83_1 and the second lower piston 83_2 coupled to each other, and a plurality of branch flow paths 83*c* are radially branched from the main flow path 83*b* when viewed from upper side, and open to the lower surface of the first lower piston 83_1 facing the first lower pressure chamber 68_1. Further, from a further downstream part of the main flow path 83*b*, a plurality of branch flow paths 83*c* are radially branched when viewed from upper side, and are respectively opened to the lower surface of the second lower piston 83_2 facing the second lower pressure chamber 68_2**.

Other configurations are the same as those of valve device 1 of the first embodiment.

The operation of valve device 101 of the second embodiment configured as described above is the same as the operation of valve device 1 of the first embodiment. However, since a total three-stage cylinder configuration is adopted, the driving force of the piston can be increased.

Third Embodiment

FIG. 5 is a vertical cross-sectional view showing an upper portion of a valve device 201 according to a third embodiment of the present invention. The lower part of the present valve device is the same as that of FIG. 1, and thus is not shown.

This embodiment is one in which the upper side of the multi-stage cylinder actuator 60 has a two-stage structure, and a total of three-stage cylinders are formed in the first embodiment.

In this embodiment, the upper cylinder chamber (64) is divided into a first upper cylinder chamber 64_1 and a second upper cylinder chamber 64_2 from the lower side by a third partition plate 85. The third partition plate 85 has sealing O-rings 91 on the outer peripheral side and the inner peripheral side in the same form as the partition plate 82. The casing 6 further includes an intermediate casing 70 between the upper casing 6 and the lower casing 69, and the inner peripheral screw portion of the lower portion of the intermediate casing 70 is screwed to the outer peripheral screw portion of the lower casing 69, and the inner peripheral screw portion of the lower end portion of the upper casing 6 is screwed to the outer peripheral screw portion of the upper portion of the intermediate casing 70, thereby they are coupled to each other. The partition plate 82 is fixed such that its outer peripheral edge portion is sandwiched between the upper end portion of the lower casing 69 and the inner peripheral step portion of the intermediate casing 70, and the third partition plate 85 is fixed such that its outer edge portion is sandwiched between the upper end portion of the intermediate casing 70 and the inner peripheral step portion of the upper casing 6.

The upper piston (81) includes a first upper piston 81_1 arranged in the first upper cylinder chamber 64_1 and a second upper piston 81_2 arranged in the second upper cylinder chamber 64_2. The first upper piston 81_1 has an upper protrusion **81_1*a* having an outer peripheral screw portion in its tip end portion, and the upper protrusion 81_1*a* passes through the central through-hole of the third partition plate 85 and is screwed to a screw hole of the second upper piston 81_2. Thus, the first upper piston 81_1 and the second upper piston 81_2 are fixedly connected so as to penetrate through the third partition plate 85** and are integrally slidably provided.

The upper pressure chamber (65) includes a first upper pressure chamber 65_1 formed between the first upper piston 81_1 and the partition plate 82, and a second upper pressure chamber 65_2 formed between the second upper piston 81_2 and the third partition plate 85. Further, the protruding tube portion **81*e* is provided at an upper end portion of the second upper piston 81_2. Note that the intermediate casing 70 is provided with a vent hole 71 to a non-pressure chamber portion of the lower cylinder chamber 66**.

The main flow path **81*b* of the upper operation air passage 81*b* extends on the central axes of the first upper piston 81_1 and the second upper piston 81_2 coupled to each other, and a plurality of branch flow path 83*c* are radially branched from the main flow path 81*b* when viewed from upper side and open to the lower surface of the first upper piston 81_1 facing the first upper pressure chamber 65_1. Further, from a further upstream part of the main flow path 81*b*, a plurality of branch flow path 81*c* are radially branched when viewed from upper side, and are respectively opened to the lower surface of the second upper piston 81_2 facing the second upper pressure chamber 65_2**.

The operation of valve device 201 of the third embodiment configured as described above is the same as the operation of valve device 1 of the first embodiment. However, since a total three-stage cylinder configuration is adopted, the driving force of the piston can be increased.

Fourth Embodiment

FIG. 6 is a vertical cross-sectional view showing an upper portion of a valve device 301 according to a fourth embodiment of the present disclosure.

The lower portion of the present valve device 301 is the same as that of FIG. 1, and thus is not illustrated.

This embodiment is one in which, in the first embodiment, as a passage for supplying the operation air to the upper pressure chamber 65, in place of the branch flow paths **81*c* (see FIG. 1) which open to the lower surface of the upper piston 81, a horizontal branch flow path 83*e* which opens to the outer peripheral surface in the abutment shaft 83*a* of the lower piston 83 is provided. In this embodiment, the cover member 7 screwed to the outer periphery of the upper casing 6 is provided so that the opening degree of each of the vent hole 62 to the non-pressure chamber portion of the upper cylinder chamber 64 and the vent hole 67 to the non-pressure chamber portion of the lower cylinder chamber 66** can be adjusted.

In the valve device 301 of this embodiment, the upper operation air passage 81*b* provided in the upper piston 81 has only the main flow path 81*b* extending on the central axis of the upper piston 81, and does not have branch flow paths 81*c* (see FIG. 1). As a result, the upper operation air passage (main flow path 81*b*) introduces the operation air from the operation air introduction hole 61 of the upper casing 6, and supplies the operation air to the lower operation air passage 83*b* of the lower piston 83 that communicates therewith.

On the other hand, the lower operation air passage 83*b* provided in the lower piston 83 has a main flow path (83*b*) that opens to a tip end portion of the abutment shaft 83*a* and extend on the central axis, and a plurality of branch flow paths 83*c* which branch radially from the main flow path 83*b* as viewed from upper side and open to the lower surface of the lower piston 83 facing the lower pressure chamber 68, and further, a plurality of horizontal branch flow paths 83*e* which branch radially from the main flow path 83*b* as viewed from upper side in the abutment shaft 83*a* and open to the outer peripheral surface of the abutment shaft 83*a*.

The openings of the horizontal branch flow paths 83*e* on the outer peripheral surface of the abutment shaft 83*a* communicate with the upper pressure chamber 65. Thus, the operation air from the upper operation air passage 81*b* is introduced through the contact portion with the upper piston 81, and the operation air can be supplied to the upper pressure chamber 65 and the lower pressure chamber 68. The number of branch flow paths 83*c* and horizontal branch flow paths 83*e* are preferably 3 or more.

Note that, in this embodiment, the branch flow paths 81*c* (see FIG. 1) that are and open to the lower surface of the upper piston 81 are omitted, but instead, a plurality of branch flow paths 83*c* that are employed in the first embodiment and open to the lower surface of the lower piston 83 may be omitted while maintaining the branch flow paths 81*c*. In this case, for example, passages (not shown) similar to the horizontal branch flow paths 83*e* may be provided in the operation shaft 83*d* of the lower piston 83 instead, and the operation air from the main flow path 83*b* may be supplied to the lower pressure chamber 68 through the passages.

In this embodiment, the cover member 7 screwed to the outer periphery of the upper casing 6 is provided so that the opening degree of each of the vent hole 62 to the non-pressure chamber portion of the upper cylinder chamber 64 and the vent hole 67 to the non-pressure chamber portion of the lower cylinder chamber 66 can be adjusted.

In the upper casing 6 shown in FIG. 6, an outer diameter of an upper portion of the cylindrical portion 6*b* is reduced than an outer diameter of a lower end side, and an outer peripheral screw portion 6*d* is formed on the upper portion of the outer peripheral surface of the reduced-diameter portion. The cover member 7 formed in a cylindrical shape is fitted to the outer periphery of the reduced-diameter portion of the cylindrical portion 6*b*, and the inner peripheral screw portion 7*a* formed on the inner peripheral surface of the cover member 7 is screwed to the outer peripheral screw portion 6*d* of the upper casing 6. By rotating the cover member 7, the cover member 7 moves in the up-down direction with respect to the upper casing 6.

The vent hole 67 communicating with the non-pressure chamber portion of the lower cylinder chamber 66 is bent upward inside the wall of the cylindrical portion 6*b* and opens to a step surface 6*e* of the cylindrical portion 6*b*. On the other hand, the vent hole 62 communicating with the non-pressure chamber portion of the upper cylinder chamber 64 opens at the outer peripheral surface immediately above the step surface 6*e* of the cylindrical portion 6*b*.

When the cover member 7 is at the lower limit position of the movable range, the lower end surface of the lower end portion 7*b* of the cover member 7 is in contact with the step surface 6*e* of the cylindrical portion 6*b* to close the opening of the vent hole 67, and the inner peripheral surface of the lower end portion 7*b* closes the opening of the vent hole 62. By rotating the cover member 7 and adjusting the up-down position thereof, the opening degrees of each of the vent hole 67 and the vent hole 62 by the lower end portion 7*b* can be adjusted. The adjusted position of the cover member 7 can be fixed by a lock screw 8 provided on the cover member 7.

Other configurations are the same as those of valve device 1 of the first embodiment.

The operation of valve device 301 of the fourth embodiment configured as described above is the same as the operation of valve device 1 of the first embodiment. However, since the branch flow path 81*c* opening to the lower surface of the upper piston 81 is omitted and the horizontal branch flow path 83*e* opening to the outer peripheral surface in the abutment shaft 83*a* of the lower piston 83 is provided, it is possible to facilitate manufacturing while maintaining the same advantages as in the first embodiment.

Further, since the opening degree of each of the vent hole 62 to the non-pressure chamber portion of the upper cylinder chamber 64 and the vent hole 67 to the non-pressure chamber portion of the lower cylinder chamber 66 can be adjusted, the load of the valve opening and closing can be adjusted, and the valve opening time and the valve closing time can be substantially matched.

The present invention is not limited to the above-described embodiments. Various additions, modifications, and the like can be made by those skilled in the art within the scope of the present disclosure.

REFERENCE SIGNS LIST

1: Valve device
2: Valve body
2*a*: Upper surface
2*b*: Lower surface
5: Bonnet
5*a*: Upper end plate
5*b*: Through screw hole
5*c*: Outer peripheral screw portion
6: Upper casing
6*a*: Upper end plate
6*b*: Cylindrical portion
6*c*: Inner peripheral screw portion
6*d*: Outer peripheral screw portion
7: Cover member
7*a*: Inner peripheral screw portion
7*b*: lower end
8: Lock screw
21: First flow path
22: Second flow path
23: Valve chamber
24: Step portion
25: Inner peripheral screw portion
41: Valve element
42: Bellows
43: Support ring
43*a*: Seal member
44: Stem

44*a*: Valve element holding portion
44*c*: Screw rod portion
45: Holding ring
46: Connecting member
47: Lower spring
48: Valve seat
51: Fixing nut
60: Multi-stage cylinder actuator
61: Operation air introduction hole
62: Vent
63: Upper spring
64: Upper cylinder chamber
64_1: First upper cylinder chamber
64_2: Second upper cylinder chamber
65: Upper pressure chamber
65_1: First upper pressure chamber
65_2: Second upper pressure chamber
66: Lower cylinder chamber
66_1: First lower cylinder chamber
66_2: Second lower cylinder chamber
67: Vent
68: Lower pressure chamber
68_1: First lower pressure chamber
68_2: Second lower pressure chamber
69: Lower casing
69*a*: Lower end plate
69*b*: Cylindrical portion
69*c*: Lower protruding tube portion
69*d*: Outer peripheral screw portion
69*e*: Outer peripheral screw portion
70: Intermediate casing
71: Vent hole
81: Upper piston
81*a*: Upper protruding portion
81*b*: Main flow path (Upper operation air passage)
81*c*: Branch flow path
81*d*: Fitting hole
81*e*: protruding tube portion
81_1: First upper piston
81_1*a*: Upper protrusion
81_2: Second upper piston
82: Partition plate
83: Lower piston
83*a*: Abutment shaft
83*b*: Main flow path (Lower operation air passage)
83*c*: Branch flow path
83*d*: Operation shaft
83*e*: Horizontal branch flow path
83_1: First lower piston
83_2: Second lower piston
83_2*a*: Upper protrusion
84: Second partition plate
85: Third partition plate
91,92,93: O-ring
101, 201, 301: Valve device
F1, F2: Thrust
R1, R2: Biasing force

What is claimed is:

1. A valve device comprising:

a valve body having a first flow path and a second flow path formed therein;

a valve element for shutting off and communicating between the first flow path and the second flow path by contacting and leaving from a valve seat provided horizontally in an opening of the first flow path; and a multi-stage cylinder actuator for making the valve element contact and leave from the valve seat, the multi-stage cylinder actuator comprising:

a casing having a cylindrical shape, extending upward from the valve body, having both end portions closed by an upper end plate and a lower end plate, respectively, and having an inside partitioned into an upper cylinder chamber and a lower cylinder chamber by a partition plate;

an upper piston arranged slidably in the upper cylinder chamber, biased in a downward direction by an upper spring and driven in an upward direction by a pressure of an operation air in an upper pressure chamber formed between the upper piston and the partition plate;

a lower piston arranged slidably in the lower cylinder chamber, biased in a downward direction by a lower spring and driven in an upward direction by a pressure of the operation air in a lower pressure chamber formed between the lower piston and the lower end plate, the lower piston having an operation shaft which projects through the lower end plate to operate the position of the valve element, and an abutment shaft which projects through the partition plate and contacts the upper piston, the upper piston having an upper operation air passage for introducing the operation air from an outside and supplying the operation air to the upper pressure chamber and the lower pressure chamber, the lower piston having a lower operation air passage in communication with the upper operation air passage at a contact portion between the upper piston and the abutment shaft, for introducing the operation air and supplying the operation air to the lower pressure chamber, wherein the contact portion is provided with an O-ring for preventing leakage of the operation air while allowing relative displacement between the upper piston and the abutment shaft.

2. The valve device according to claim 1, wherein the upper piston has a fitting hole fitted to the abutment shaft of the lower piston, and the contact portion is formed between a tip end portion of the abutment shaft and a deep end of the fitting hole, and the O-ring is arranged between an outer periphery of a reduced-diameter portion provided in a tip end portion of the abutment shaft and an inner periphery of the fitting hole.

3. The valve device according to claim 1 or 2, wherein the upper operation air passage includes a main flow path provided on a central axis in the upper piston, and the lower operation air passage includes a main flow passage provided on a central axis in the lower piston, at least one of the upper operation air passage and the lower operation air passage further includes a plurality of branch flow paths that branch radially from the main flow path when viewed from upper side and open to a lower surface of the upper piston facing the upper pressure chamber or a lower surface of the lower piston facing the lower pressure chamber.

4. The valve device according to claim 3, wherein when the upper operation air passage has the branch flow paths, the number of the branch flow paths is 3 or more, and when the lower operation air passage has the branch flow paths, the number of the branch flow paths is 3 or more.

5. The valve device according to claim 1, wherein the casing further includes a second partition plate for partitioning the lower cylinder chamber into a first lower cylinder chamber and a second lower cylinder chamber from the upper side, the lower piston includes a first lower piston arranged in the first lower cylinder chamber and a second lower piston arranged in the second lower cylinder chamber, and the first lower piston and the second lower piston are fixedly connected to each other so as to penetrate through the second partition plate and be provided integrally slidable, the lower pressure chamber includes a first lower pressure chamber formed between the first lower piston and the second partition plate and a second lower pressure chamber formed between the second lower piston and the lower end plate, the operation shaft is provided on the second lower piston, and the abutment shaft is provided on the first lower piston.

6. The valve device according to claim 1, wherein the casing further includes a third partition plate for partitioning the upper cylinder chamber into a first upper cylinder chamber and a second upper cylinder chamber from the lower side, the upper piston includes a first upper piston arranged in the first upper cylinder chamber, and a second upper piston arranged in the second upper cylinder chamber, the first upper piston and the second upper piston are fixedly connected so as to penetrate through the third partition plate and be provided integrally slidable, the upper pressure chamber includes a first upper pressure chamber formed between the first upper piston and the partition plate and a second upper pressure chamber formed between the second upper piston and the third partition plate.

7. The valve device according to claim 1, wherein the valve element is attached to a support mechanism including a bellows that integrally seals the opening of the first flow path and the opening of the second flow path from the outside while allowing vertical movement of the valve element.

* * * * *